(12) United States Patent
Phillips et al.

(10) Patent No.: US 12,182,816 B2
(45) Date of Patent: *Dec. 31, 2024

(54) TRANSACTION CONFIRMATION AND AUTHENTICATION BASED ON DEVICE SENSOR DATA

(71) Applicant: Capital One Services, LLC, McLean, VA (US)

(72) Inventors: Jeremy Phillips, Brooklyn, NY (US); Zhe Liu, McLean, VA (US); Kurry Tran, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,899

(22) Filed: Sep. 1, 2023

(65) Prior Publication Data

US 2023/0410112 A1    Dec. 21, 2023

Related U.S. Application Data

(63) Continuation of application No. 17/455,706, filed on Nov. 19, 2021, now Pat. No. 11,783,335, which is a
(Continued)

(51) Int. Cl.
*G06Q 20/40*    (2012.01)
*G06Q 20/22*    (2012.01)
(Continued)

(52) U.S. Cl.
CPC ..... *G06Q 20/40145* (2013.01); *G06Q 20/223* (2013.01); *G06Q 20/3224* (2013.01);
(Continued)

(58) Field of Classification Search
None
See application file for complete search history.

(56) References Cited

U.S. PATENT DOCUMENTS

| 7,172,563 B2 | 2/2007 | Takiguchi et al. |
| 7,548,886 B2 | 6/2009 | Kirkland et al. |

(Continued)

FOREIGN PATENT DOCUMENTS

WO    2016126775 A1    8/2016

OTHER PUBLICATIONS

D. M. Shila, K. Srivastava, P. O'Neill, K. Reddy and V. Sritapan, "A multi-faceted approach to user authentication for mobile devices—Using human movement, usage, and location patterns," 2016 IEEE Symposium on Technologies for Homeland Security (HST), Waltham, MA, USA, 2016, pp. 1-6 (Year: 2016).*

(Continued)

*Primary Examiner* — Mohammad Z Shaikh
(74) *Attorney, Agent, or Firm* — Harrity & Harrity, LLP

(57) ABSTRACT

A device may receive transaction data indicating that a transaction occurred. The transaction may be between a first user of a first device and a second user of a second device. The device may receive, from the first device, first sensor data indicating a first location recorded by a first sensor of the first device at a first point in time associated with the transaction; and receive, from the second device, second sensor data indicating a second location recorded by a second sensor of the second device at a second point in time associated with the transaction. Based on the transaction data, the first sensor data, and/or the second sensor data, the device may determine whether the transaction occurred and perform an action based on the determination of whether the transaction occurred.

20 Claims, 4 Drawing Sheets

Related U.S. Application Data continuation of application No. 16/358,075, filed on Mar. 19, 2019, now Pat. No. 11,188,915, which is a continuation of application No. 15/820,161, filed on Nov. 21, 2017, now Pat. No. 10,269,017.

(51) Int. Cl.
  *G06Q 20/32* (2012.01)
  *H04L 9/40* (2022.01)

(52) U.S. Cl.
  CPC ..... *G06Q 20/4016* (2013.01); *H04L 63/0492* (2013.01); *H04L 63/0861* (2013.01)

(56) References Cited

U.S. PATENT DOCUMENTS

| | | | |
|---|---|---|---|
| 7,959,539 | B2 | 6/2011 | Takeishi et al. |
| 8,079,079 | B2 | 12/2011 | Zhang et al. |
| 8,090,616 | B2 | 1/2012 | Proctor, Jr. et al. |
| 8,135,624 | B1 | 3/2012 | Ramalingam et al. |
| 8,447,272 | B2 | 5/2013 | Faith et al. |
| 8,606,497 | B2 | 12/2013 | Doherty et al. |
| 8,639,621 | B1 | 1/2014 | Ellis et al. |
| 8,854,182 | B2 | 10/2014 | Lobean et al. |
| 8,898,771 | B1 | 11/2014 | Kim et al. |
| 8,905,303 | B1 | 12/2014 | Ben et al. |
| 8,924,292 | B1 | 12/2014 | Ellis et al. |
| 9,032,498 | B1 | 5/2015 | Ben et al. |
| 9,135,612 | B1 | 9/2015 | Proctor, Jr. et al. |
| 9,305,155 | B1* | 4/2016 | Vo .................... G06F 3/0482 |
| 9,305,298 | B2* | 4/2016 | Wilson ................ H04L 9/0822 |
| 9,438,606 | B1 | 9/2016 | Bartley et al. |
| 9,489,503 | B2 | 11/2016 | Nahari et al. |
| 9,554,274 | B1 | 1/2017 | Castinado et al. |
| 9,699,610 | B1 | 7/2017 | Chicoine et al. |
| 9,762,581 | B1 | 9/2017 | Wang et al. |
| 9,824,265 | B2 | 11/2017 | Zhong et al. |
| 10,007,941 | B1 | 6/2018 | Liu |
| 10,075,846 | B1 | 9/2018 | Acar et al. |
| 10,172,535 | B2 | 1/2019 | Lee et al. |
| 10,269,017 | B1* | 4/2019 | Phillips .............. G06Q 20/4016 |
| 10,284,552 | B1 | 5/2019 | Wurmfeld |
| 10,346,841 | B2 | 7/2019 | Koeppel et al. |
| 10,482,451 | B2* | 11/2019 | Buckman ............. H04W 76/14 |
| 10,891,363 | B2* | 1/2021 | Kim ...................... G06F 21/316 |
| 11,188,915 | B2* | 11/2021 | Phillips .............. G06Q 20/4016 |
| 11,783,335 | B2* | 10/2023 | Phillips ............ G06Q 20/40145 |
| | | | 705/44 |
| 2003/0101069 | A1 | 5/2003 | Sando et al. |
| 2003/0114206 | A1 | 6/2003 | Timothy et al. |
| 2008/0007553 | A1 | 1/2008 | Nagase et al. |
| 2008/0172725 | A1* | 7/2008 | Fujii ...................... G07C 9/37 |
| | | | 726/5 |
| 2008/0175443 | A1 | 7/2008 | Kahn et al. |
| 2010/0082484 | A1* | 4/2010 | Erhart ................ G06Q 20/3224 |
| | | | 705/44 |
| 2010/0115610 | A1 | 5/2010 | Tredoux et al. |
| 2011/0053559 | A1 | 3/2011 | Klein et al. |
| 2011/0185413 | A1* | 7/2011 | Fujii ...................... G07C 9/37 |
| | | | 726/7 |
| 2012/0190386 | A1 | 7/2012 | Anderson |
| 2012/0203663 | A1 | 8/2012 | Sinclair et al. |
| 2012/0240195 | A1 | 9/2012 | Weiss |
| 2013/0133049 | A1* | 5/2013 | Peirce .................... G06F 21/32 |
| | | | 726/6 |
| 2014/0089243 | A1* | 3/2014 | Oppenheimer ......... H04L 67/12 |
| | | | 706/46 |
| 2014/0089672 | A1 | 3/2014 | Luna et al. |
| 2014/0130127 | A1* | 5/2014 | Toole .................... G06F 21/316 |
| | | | 726/3 |
| 2014/0171039 | A1 | 6/2014 | Bjontegard et al. |
| 2014/0289116 | A1 | 9/2014 | Polivanyi |
| 2014/0289821 | A1 | 9/2014 | Wilson |
| 2014/0289822 | A1* | 9/2014 | Wilson ................ H04L 9/0819 |
| | | | 726/5 |
| 2014/0289833 | A1* | 9/2014 | Briceno ............... H04W 12/06 |
| | | | 726/5 |
| 2014/0341440 | A1 | 11/2014 | Walch |
| 2015/0033305 | A1 | 1/2015 | Shear et al. |
| 2015/0262008 | A1 | 9/2015 | Stewart et al. |
| 2015/0294303 | A1 | 10/2015 | Hanson et al. |
| 2015/0310443 | A1 | 10/2015 | Thomasson |
| 2016/0063227 | A1* | 3/2016 | Kobres ................. H04W 12/33 |
| | | | 726/3 |
| 2016/0063471 | A1* | 3/2016 | Kobres ................. G06Q 20/40 |
| | | | 705/18 |
| 2016/0063503 | A1* | 3/2016 | Kobres ................. G06V 40/172 |
| | | | 705/18 |
| 2016/0068265 | A1 | 3/2016 | Hoareau et al. |
| 2016/0182496 | A1 | 6/2016 | Weast et al. |
| 2016/0189149 | A1* | 6/2016 | MacLaurin ....... G06Q 20/40145 |
| | | | 705/44 |
| 2016/0189158 | A1* | 6/2016 | Eramian ............. G06Q 20/4014 |
| | | | 705/44 |
| 2016/0191511 | A1 | 6/2016 | Tijerina et al. |
| 2016/0350761 | A1 | 12/2016 | Raziel et al. |
| 2016/0363914 | A1 | 12/2016 | Kim et al. |
| 2017/0013464 | A1 | 1/2017 | Fish et al. |
| 2017/0041759 | A1* | 2/2017 | Gantert ................... H04W 4/80 |
| 2017/0061405 | A1 | 3/2017 | Bryant et al. |
| 2017/0061424 | A1 | 3/2017 | Dent et al. |
| 2017/0091764 | A1 | 3/2017 | Lloyd et al. |
| 2017/0091765 | A1 | 3/2017 | Lloyd et al. |
| 2017/0243225 | A1 | 8/2017 | Kohli |
| 2017/0337563 | A1 | 11/2017 | Chen et al. |
| 2018/0041503 | A1* | 2/2018 | Lindemann ........... H04L 63/061 |
| 2018/0225356 | A1 | 8/2018 | Yue |
| 2018/0285544 | A1 | 10/2018 | Chang et al. |
| 2018/0302414 | A1 | 10/2018 | Wagner |
| 2022/0076269 | A1 | 3/2022 | Phillips et al. |

OTHER PUBLICATIONS

"Method of Secure Application on Mobile Devices Based on Environmental sensors", IP.com Prior Art Database Technical Disclosure, Aug. 10, 2012, pp. 1-6. (Year: 2012).*

Derawi M.O., et al., "Unobtrusive User-Authentication on Mobile Phones using Biometric Gait Recognition," 2010 Sixth International Conference on Intelligent Information Hiding and Multimedia Signal Processing, IEEE Computer Society, Darmstadt, Germany, 2010, pp. 306-311.

Extended European Search Report for Application No. EP18207431. 0, mailed on May 2, 2019, 8 pages.

Shila D.M., et al., "A Multifaceted Approach to User Authentication for Mobile Devices—Using Human Movement, Usage, and Location Patterns," 2016 IEEE Symposium on Technologies for Homeland Security (HST), Waltham, MA, USA, 2016, pp. 1-6.

* cited by examiner

TRANSACTION CONFIRMATION AND AUTHENTICATION BASED ON DEVICE SENSOR DATA

RELATED APPLICATIONS

This application is a continuation of U.S. patent application Ser. No. 17/455,706, filed Nov. 19, 2021, which is a continuation of Ser. No. 16/358,075, filed Mar. 19, 2019 (now U.S. Pat. No. 11,188,915), which is a continuation of U.S. patent application Ser. No. 15/820,161, filed Nov. 21, 2017 (now U.S. Pat. No. 10,269,017), the contents of which are incorporated herein by reference in their entireties.

BACKGROUND

People often meet one another to conduct transactions, such as peer-to-peer transactions that may involve people meeting to exchange goods, services, and/or payment. In some situations, location-based services provided by computing devices may be used to facilitate peer-to-peer transactions. For example, computing devices often include components capable of identifying a location of the computing device (e.g., global positioning satellite components, Wi-Fi components, and/or the like), which can be provided to other users and/or devices (e.g., for conducting peer-to-peer transactions).

SUMMARY

According to some implementations, a device may include one or more processors to: receive transaction data, the transaction data indicating that a transaction occurred, the transaction being between a first user of a first device and a second user of a second device; receive, from the first device, first sensor data, the first sensor data indicating: a first location recorded by a first sensor of the first device at a first point in time, the first point in time being associated with the transaction; and first gait data recorded by a gait sensor of the first device, the first gait data indicating a gait of the first user of the first device; receive, from the second device, second sensor data, the second sensor data indicating a second location recorded by a second sensor of the second device at a second point in time, the second point in time being associated with the transaction; determine whether the transaction occurred based on the transaction data, the first sensor data, and the second sensor data; receive gait authentication data associated with the first user of the first device; and determine whether the transaction is authentic based on the gait authentication data and the first gait data.

According to some implementations, a non-transitory computer-readable medium may store instructions, the instructions comprising one or more instructions that, when executed by one or more processors of a device, cause the one or more processors to: receive transaction data, the transaction data indicating that a transaction occurred, the transaction being between a first user of a first device and a second user of a second device; receive, from the first device, first sensor data, the first sensor data indicating a first location recorded by a first sensor of the first device at a first point in time, the first point in time being associated with the transaction; receive, from the second device, second sensor data, the second sensor data indicating a second location recorded by a second sensor of the second device at a second point in time, the second point in time being associated with the transaction; determine whether the transaction occurred based on the transaction data, the first sensor data, and the second sensor data; and perform an action based on the determination of whether the transaction occurred.

According to some implementations, a method may include: receiving, by a server device, transaction data, the transaction data indicating that a transaction occurred, the transaction being between a first user of a first device and a second user of a second device; receiving, by the server device and from the first device, first sensor data, the first sensor data indicating: first image data recorded by a camera of the first device at a first point in time, the first point in time being associated with the transaction; and receiving, by the server device and from the second device, second sensor data, the second sensor data indicating a second location recorded by a second sensor of the second device at a second point in time, the second point in time being associated with the transaction; determining, by the server device, whether the transaction occurred based on the transaction data, the first sensor data, and the second sensor data; and performing, by the server device, an action based on the determination.

DETAILED DESCRIPTION

The following detailed description of example implementations refers to the accompanying drawings. The same reference numbers in different drawings may identify the same or similar elements.

Users that wish to physically meet one another, e.g., for the purpose of conducting a transaction, such as providing and/or receiving a product and/or service, may use user devices to facilitate meeting one another. For example, users may make use of user devices, such as mobile phones, that use a peer-to-peer application to facilitate users meeting one another to conduct a transaction. For a transaction server, such as a peer-to-peer application server that facilitates communications between users that wish to conduct transactions in person, it may be difficult to confirm whether a peer-to-peer transaction has taken place and, if it has, whether the transaction was authentic, e.g., whether the users involved in the transaction are who they purport to be during the transaction.

Some implementations, described here, provide a transaction server that is capable of using sensor data provided by user devices during a transaction to confirm and/or authenticate the transaction. For example, the transaction server may confirm a transaction based on geographic location data provided by the user devices involved in the transaction (e.g., by confirming that the user devices were in the same place at the time of the transaction). As an example method of authenticating users, the transaction server may perform gait analysis on sensor data provided by one or both of the user devices to confirm that the user(s) involved in the transaction are who they claim to be. Other methods of transaction confirmation and/or authentication may also be performed by transaction server based on sensor data provided by user devices.

The ability to use sensor data to confirm and/or authenticate a transaction may improve the security and reliability of peer-to-peer transactions, e.g., by reducing the occurrences of fraudulent transactions and/or identify fraudulent transactions. Confirming a transaction may be simplified for users of user devices by, in some implementations, automating transaction confirmation without requiring a user to separately confirm or authenticate a transaction. Sensor based confirmation and/or authentication may also conserve resources (including processing resources, network resources, and time resources, for example) for user devices and transaction servers by obviating the need for users to manually confirm and/or authenticate a transaction, and/or obviating the need for manual investigation regarding authenticity of a transaction by operators of transaction servers.

Figure 1:
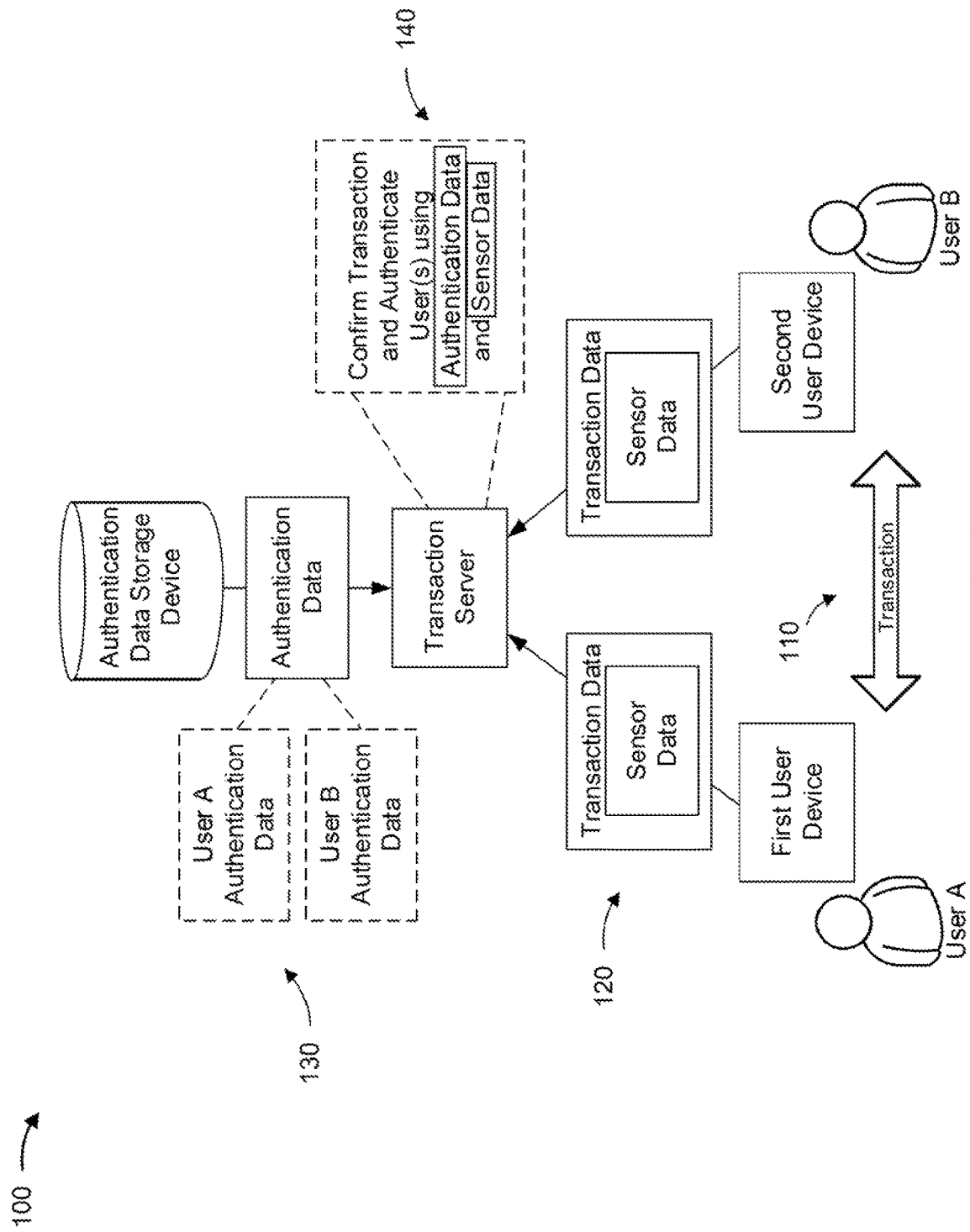
FIG. 1 is a diagram of an overview of an example implementation described herein.

FIG. 1 is a diagram of an overview of an example implementation 100 described herein. As shown in FIG. 1, example implementation 100 may include a first user device, a second user device, a transaction server, and an authentication data storage device.

As shown in FIG. 1, and by reference number 110, user A and user B conduct a peer-to-peer transaction (e.g., user A physically meets with user B to exchange goods, services, currency, and/or the like). In some implementations, the transaction may be facilitated by the user devices of the users (e.g., the first user device and the second user device). By way of example, the users may each use one or more applications operating on their respective user devices to locate each other and meet to conduct the transaction.

As further shown in FIG. 1, and by reference number 120, the user devices provide transaction data and sensor data to the transaction server. The transaction data may include a variety of information regarding the transaction, such as the type and/or amount of goods, services, and/or currency exchanged, information identifying user accounts of the users, a location of the transaction, and/or the like. The sensor data may include a variety of sensor data (e.g., sensor measurements) collected by one or more sensors of the user devices, such as global positioning satellite (GPS) location data, accelerometer data, gyroscope data, camera data, fingerprint sensor data, and/or the like. In some implementations, the transaction data and/or sensor data may be provided to the transaction server using an application operating on each of the user devices, e.g., a peer-to-peer transaction application associated with the transaction server.

As further shown in FIG. 1, and by reference number 130, the transaction server obtains authentication data for user A and user B from the authentication data storage device. Authentication data may include a variety of previously stored sensor data that can act as a signature to authenticate the users of the first user device and/or the second user device. For example, authentication data may include gait authentication data, or a gait signature, that indicates the manner in which a user travels (e.g., using GPS data, accelerometer data, gyroscope data, and/or the like), a facial recognition signature that indicates features of a user's face, a biometric signature that indicates features of one or more fingers of a user, a retina signature that indicates features of a user's retina, voice signature that indicates features of a user's voice, and/or the like. The authentication data may be obtained from the authentication data storage device, for example, using data identifying a user's account included in the transaction data.

As further shown in FIG. 1, and by reference number 140, the transaction server confirms whether the transaction occurs and/or authenticates one or both users associated with the transaction. The transaction server may confirm the transaction using the sensor data provided by the user devices. For example, the transaction server may use GPS data included in the sensor data to determine that the first user device and the second user device were at the same location at the same time and for a threshold period of time associated with the transaction. The transaction server may authenticate the transaction using the sensor data and the authentication data. For example, the transaction server may determine whether gait data included in the sensor data from matches a gait signature of the corresponding user. Based on the confirmation and/or authentication determinations, the transaction server may perform a variety of actions, including notifying one or more users regarding the results, logging the transaction, authorizing the transaction, and/or the like. Thus, the transaction server may use sensor data provided by user devices during a transaction to confirm and/or authenticate the transaction.

As indicated above, FIG. 1 is provided merely as an example. Other examples are possible and may differ from what was described with regard to FIG. 1. In some implementations, the transaction server may be capable of receiving transaction data and sensor data from many user devices at many different times. In this situation, transaction server may receive transaction data and sensor data associated with hundreds, thousands, millions, billions, or more transactions, enabling transaction device to perform transaction confirmation and/or authentication for hundreds, thousands, millions, billions, or more transactions.

Figure 2:
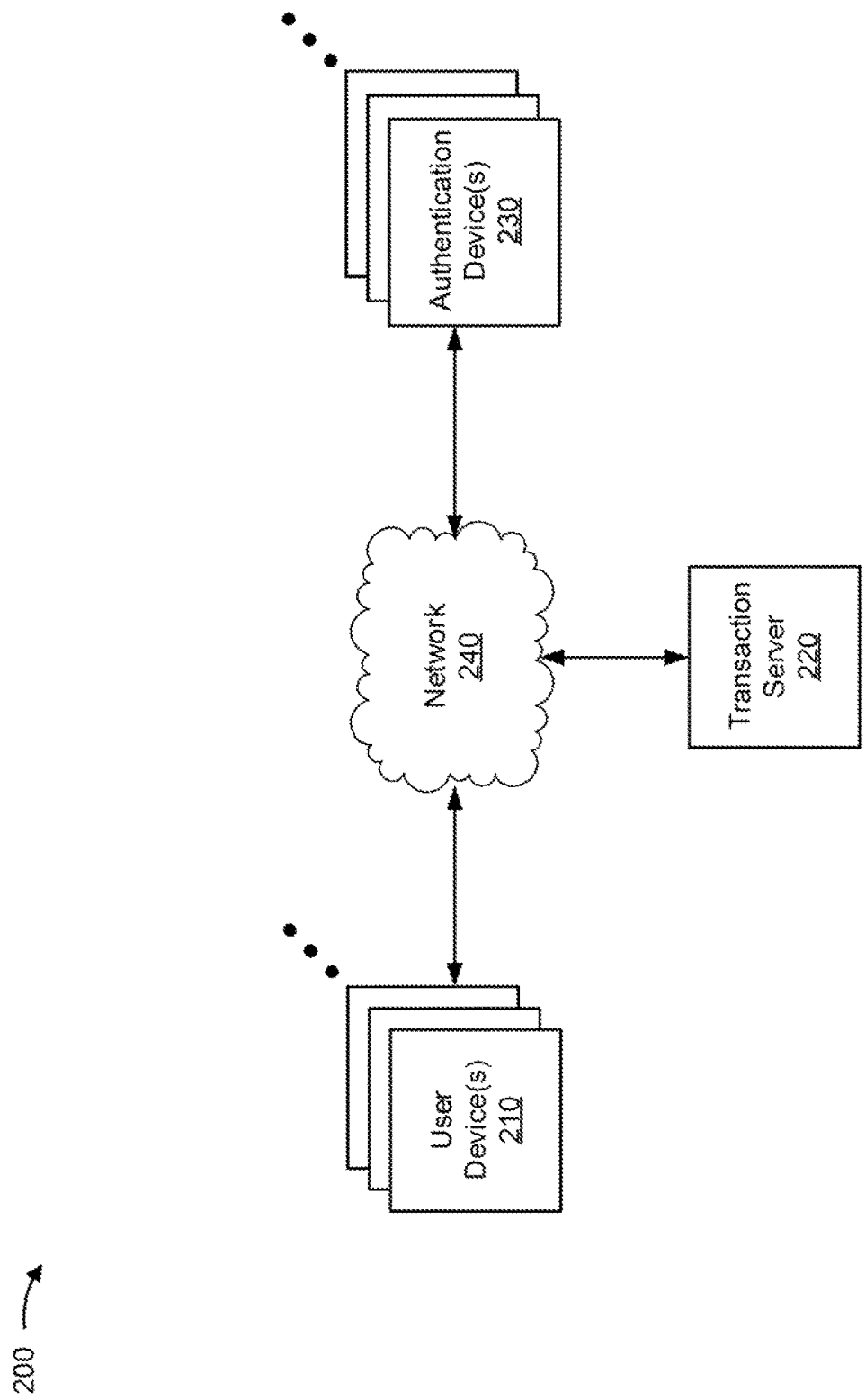
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210, transaction server 220, one or more authentication devices 230, and network 240. Devices of environment 200 may interconnect via wired connections, wireless connections, or a combination of wired and wireless connections.

User device 210 includes one or more devices capable of receiving, generating, storing, processing, and/or providing information associated with transactions and/or sensor data. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include one or more sensors capable of producing sensor data, such a GPS sensor, Wi-Fi radio, Bluetooth radio, near-field communications (NFC) component, a camera, a fingerprint sensor, and/or the like. In some implementations, user device 210 may include one or more applications to facilitate peer-to-peer transactions, such as a peer-to-peer transaction application to facilitate transactions involving products and/or services that can be provided by nearby users, e.g., users of other user devices 210.

Transaction server 220 includes one or more devices capable of receiving, generating, storing, processing, and/or providing information associated with transactions and/or user device sensor data. Transaction server 220 may include a computing device, such as a server computer, personal computer, mobile phone, laptop computer, tablet computer, or a similar type of device. In some implementations, transaction server 220 includes hardware and/or a combination of hardware and software to enable communications with and between other devices, such as user devices 210. In some implementations, transaction server 220 may be implemented by a group of server devices of a cloud computing environment or a data center. For example, some or all of the functions of transaction server 220 may be performed by one or more virtual machines implemented on one or more server devices in a cloud computing environment or a data center. Transaction server 220 may, in some implementations, have access to local and/or remote storage of user data for users of user devices 210 (e.g., user data that may include authentication data). In some implementations, transaction server 220 may be an application server, e.g., a server device associated with one or more applications that operate on user devices 210 to facilitate peer-to-peer transactions between users of user devices 210.

Authentication device 230 includes one or more devices capable of receiving, generating, storing, processing, and/or providing information associated with authentication based on sensor data. For example, authentication device 230 may include a communication and/or computing device, such as a server computer, personal computer, mobile phone, laptop computer, tablet computer, or a similar type of device. Authentication device 230 may be capable of analyzing sensor data to produce sensor based signatures, produce sensor data that can be compared to the signatures, and/or determine whether sensor data matches a signature. Signatures may be based on a variety of authentication, such as object recognition methods (e.g., facial recognition, fingerprint recognition, retina recognition, voice recognition, and/or the like), gait recognition, ocular recognition, and/or the like. For example, authentication device 230 may include a gait authentication device that uses raw sensor data as input (e.g., gait sensor data, such as GPS, accelerometer, and/or gyroscope data) to produce a gait signature for a user. An example gait recognition device may also be capable of using raw sensor data to convert the sensor data into gait data that can be compared to a gait signature. Additionally, or alternatively, an example gait recognition device may perform authentication by comparing gait data to a gait signature to determine whether a match exists (e.g., an exact match or a match within a threshold degree of similarity).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
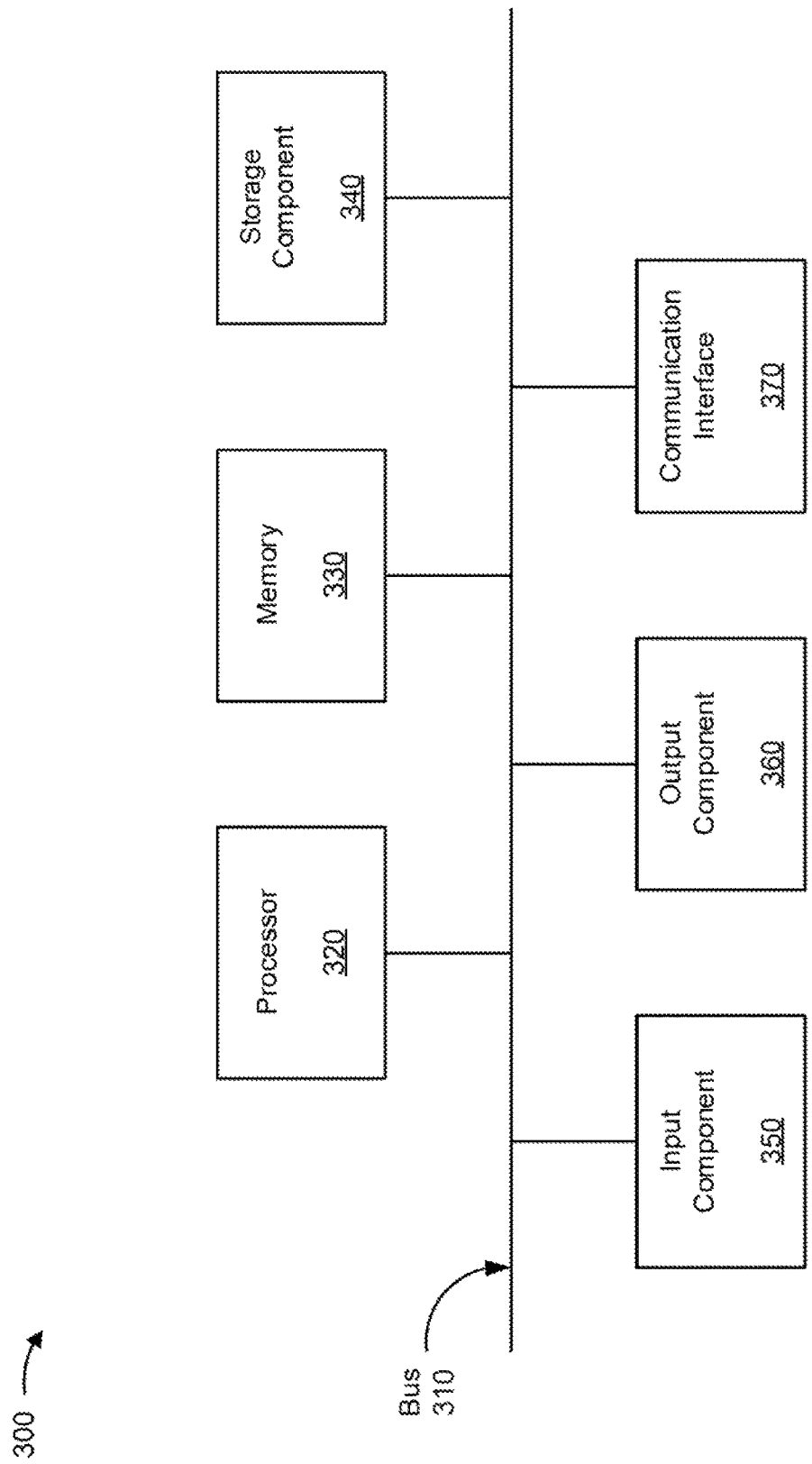
FIG. 3 is a diagram of example components of one or more devices of FIG. 2.

FIG. 3 is a diagram of example components of a device 300. Device 300 may correspond to user device 210, transaction server 220, and/or authentication device 230. In some implementations, user device 210, transaction server 220, and/or authentication device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
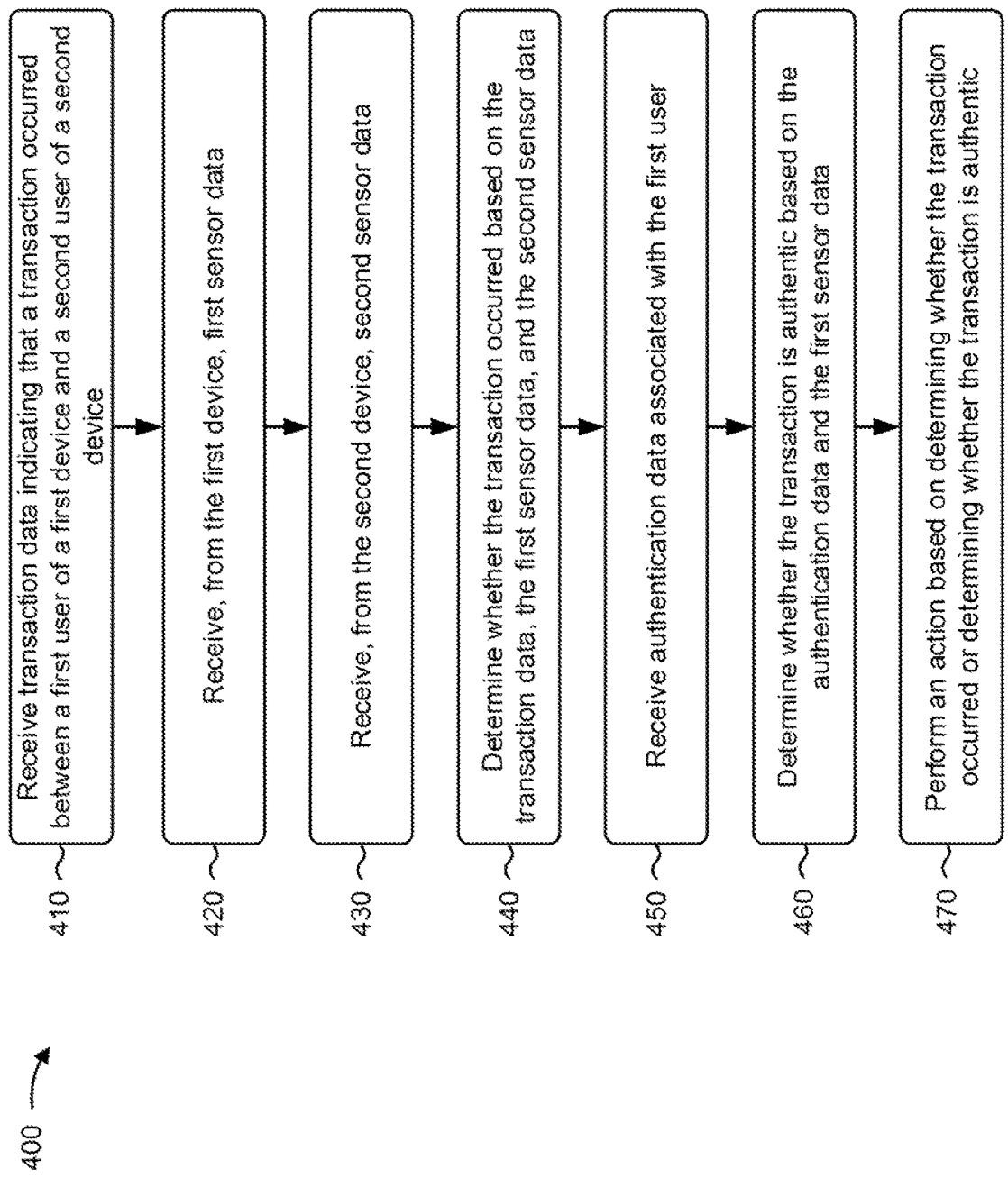
FIG. 4 is a flow chart of an example process for performing transaction confirmation and/or authentication based on device sensor data.

FIG. 4 is a flow chart of an example process 400 for performing transaction confirmation and/or authentication based on device sensor data. In some implementations, one or more process blocks of FIG. 4 may be performed by transaction server 220. In some implementations, one or more process blocks of FIG. 4 may be performed by another device or a group of devices separate from or including transaction server 220, such as user device(s) 210 and/or authentication device(s) 230.

As shown in FIG. 4, process 400 may include receiving transaction data indicating that a transaction occurred between a first user of a first device and a second user of a second device (block 410). For example, transaction server 220 may receive transaction data from a first user device 210 and/or a second user device 210, and the transaction data may identify details of the transaction between the first user device 210 and the second user device 210. In some implementations, the transaction data can be provided via a peer-to-peer transaction application operating on the first user device 210 and/or the second user device 210.

The transaction data may include a variety of information regarding a transaction between a user of the first user device 210 and a user of the second user device 210. For example, transaction data may include data identifying products, services, and/or currency involved in the transaction. Additionally, or alternatively, the transaction data may include, by way of example, data identifying the first user device 210 and the second user device 210 (e.g., the user devices 210 involved in the transaction). Additionally, or alternatively, the transaction data may include one or more times associated with the transaction (e.g., a time when the transaction was initiated and/or a time when the transaction completed). Additionally, or alternatively, the transaction data may include, in some implementations, location data that identifies a location where the transaction occurred. In some implementations, transaction data is collected automatically by the first user device 210 and/or the second user device 210 (e.g., via the peer-to-peer application) and provided to transaction server 220 based on user input to the first user device 210 and/or the second user device 210 (e.g., user input provided to the peer-to-peer application that causes the first user device 210 and/or the second user device 210 to provide transaction data to transaction server 220).

Transaction server 220 may receive the transaction data in a variety of different ways. In some implementations, transaction server 220 is provided with transaction data before the transaction occurs. For example, transaction server 220 may implement a peer-to-peer application server that receives transaction data from the first user device 210 and/or the second user device 210 when the transaction is initiated (e.g., based on the users of first user device 210 and the second user device 210 agreeing to conduct a transaction and providing transaction server 220 with transaction initiation data indicating the transaction is to take place at a future time). In some implementations, transaction server receives the transaction data based on the occurrence of an event, such as the first user device 210 and/or the second user device 210 providing an indication that the transaction previously occurred. In some implementations, transaction server 220 may receive transaction data in batches, e.g., for multiple pairs of user devices 210 that were (or are going to be) used to facilitate the occurrence of a transaction. In some implementations, transaction server 220 may receive transaction data from a third party device, e.g., a separate computing device operated by an entity that causes the separate computing device to provide transaction data to transaction server 220 for transaction confirmation and/or authentication.

In this way, transaction server 220 may receive transaction data that enables transaction server 220 to confirm and/or authenticate the corresponding transaction.

As further shown in FIG. 4, process 400 may include receiving, from the first device, first sensor data (block 420). For example, transaction server 220 may receive, from the first user device 210, first sensor data that may include a variety of data that transaction server 220 may use to confirm and/or authenticate the transaction. In some implementations, the first sensor data may be included in the transaction data provided by the first user device 210 or sent by the first user device 210 based on the sending of the transaction data. In some implementations, transaction server 220 may request first sensor data from the first user device 210 (e.g., based on transaction server 220 receiving the transaction data). In some implementations, the first sensor data can be provided to transaction server 220 via a peer-to-peer transaction application operating on the first user device 210.

The first sensor data may include a variety of information associated with various sensors of the first user device 210. For example, the first sensor data may include GPS location data, Wi-Fi radio information, Bluetooth radio information, NFC data, camera data (e.g., including an image or images and corresponding image metadata, such as geographic location tags associated with the image or images), biometric data, accelerometer data, environmental data, gyroscope data, and/or the like. In some implementations, the first sensor data, or portions of the first sensor data, may be associated with a time, or timestamp, e.g., providing an indication of the time at which the sensor data was captured by the first user device 210.

Transaction server 220 may receive the first sensor data in a variety of different ways. In some implementations, transaction server 220 is provided with first sensor data before the transaction occurs. For example, transaction server 220 may implement a peer-to-peer application server that receives first sensor data from the first user device 210 when the transaction is initiated (e.g., based on the users of first user device 210 and the second user device 210 agreeing to conduct a transaction) and/or during the transaction (e.g., while the user of the first user device 210 and the user of the second user device 210 are in transit to conduct the transaction). In some implementations, transaction server 220 receives the first sensor data based on the occurrence of an event, such as the first user device 210 and/or the second user device 210 providing an indication that the transaction previously occurred. In some implementations, transaction server 220 may receive first sensor data in batches, e.g., for multiple pairs of user devices 210 that were (or are going to be) used to facilitate the occurrence of a transaction. In some implementations, transaction server 220 may receive first sensor data from a third party device, e.g., a separate computing device operated by an entity that causes the separate computing device to provide first sensor data to transaction server 220 for transaction confirmation and/or authentication.

In this way, transaction server 220 may receive first sensor data from the first user device 210, enabling transaction server 220 to use at least a portion of the first sensor data to confirm the transaction and/or authenticate the user of the first user device 210.

As further shown in FIG. 4, process 400 may include receiving, from the second device, second sensor data (block 430). For example, transaction server 220 may receive, from the second user device 210, second sensor data that may include a variety of data that transaction server 220 may use to confirm and/or authenticate the transaction. Transaction server 220 may, in some implementations, receive the second sensor data in a manner similar to receiving the first sensor data. For example, in some implementations, the second sensor data may be included in the transaction data provided by the second user device 210 or sent by the second user device 210 based on the sending of the transaction data. In some implementations, transaction server 220 may request second sensor data from the second user device 210 (e.g., based on transaction server 220 receiving the transaction data). In some implementations, the second sensor data can be provided to transaction server 220 via a peer-to-peer transaction application operating on the second user device 210.

As with the first sensor data, the second sensor data may include a variety of information associated with various sensors of the second user device 210. For example, second sensor data may include GPS location data, Wi-Fi radio information, Bluetooth radio information, NFC data, camera data (e.g., including an image or images), biometric data, accelerometer data, environmental data, gyroscope data, and/or the like. In some implementations, the second sensor data, or portions of the second sensor data, may be associated with a time, or timestamp, e.g., providing an indication of the time at which the sensor data was captured by the second user device 210.

As with the first sensor data, transaction server 220 may receive the second sensor data in a variety of different ways. In some implementations, transaction server 220 is provided with second sensor data before the transaction occurs. For example, transaction server 220 may implement a peer-to-peer application server that receives second sensor data from the second user device 210 when the transaction is initiated (e.g., based on the users of first user device 210 and second user device 210 agreeing to conduct a transaction) and/or during the transaction (e.g., while the user of the first user device 210 and the user of the second user device 210 are in transit to conduct the transaction). In some implementations, transaction server 220 receives the second sensor data based on the occurrence of an event, such as the first user device 210 and/or the second user device 210 providing an indication that the transaction previously occurred. In some implementations, transaction server 220 may receive second sensor data in batches, e.g., for multiple pairs of user devices 210 that were (or are going to be) used to facilitate the occurrence of a transaction. In some implementations, transaction server 220 may receive second sensor data from a third party device, e.g., a separate computing device operated by an entity that causes the separate computing device to provide second sensor data to transaction server 220 for transaction confirmation and/or authentication.

In this way, transaction server 220 may receive second sensor data from the second user device 210, enabling transaction server 220 to use at least a portion of the second sensor data to confirm the transaction and/or authenticate the user of the second user device 210.

As further shown in FIG. 4, process 400 may include determining whether the transaction occurred based on the transaction data, the first sensor data, and the second sensor data (block 440). For example, transaction server 220 may determine whether the transaction occurred based on the transaction data, the first sensor data, and the second sensor data. In some implementations, transaction server 220 may determine that the transaction occurred based on receiving multiple pieces of information that indicate the transaction occurred. For example, the transaction data may indicate that the transaction occurred, but transaction server 220 may determine that, without additional data to corroborate the transaction, that the transaction cannot be confirmed.

In some implementations, the transaction data includes data indicating that the transaction occurred. For example, the transaction data may include an explicit indication that a transaction occurred (e.g., the user of first user device 210 may provide, in the transaction data, data that indicates the goods, services, and/or currency associated with the transaction was/were exchanged). In some implementations, such as when transaction server 220 implements a peer-to-peer application server, transaction server 220 may receive the transaction data from the first user device 210 that indicates the user of the first user device 210 received a particular good or service and agrees to have a user account associated with the user of the first user device 210 charged for an amount indicated by the transaction data. Additionally, or alternatively, transaction server 220 may receive the transaction data from the second user device 210 that indicates the user of the second user device 210 provided a particular good or service and agrees to have a user account associated with the user of the second user device 210 credited for an amount indicated by the transaction data. As noted above, the transaction data can include a variety of other information regarding the transaction, such as a geographic location associated with the transaction, a time associated with the transaction, and/or the like. While the transaction data may indicate that a transaction occurred, transaction server 220 may use the first sensor data, the second sensor data, and/or the transaction data to confirm the occurrence of the transaction.

In some implementations, transaction server 220 determines whether the transaction occurred based on location data included in the first sensor data and/or location data included in the second sensor data. For example, transaction server 220 may identify, from the first sensor data, a first geographic location of the first user device 210 at a time associated with occurrence of the transaction (e.g., GPS location data, Wi-Fi radio data, and/or the like). Transaction server 220 may compare the first geographic location of the first user device 210 and a geographic location specified by the transaction data, e.g., in a manner designed to determine whether the first user device 210 was in the geographic location specified by the transaction data at or near the time associated with the transaction. Additionally, or alternatively, transaction server 220 may identify, from the second sensor data, a second geographic location of the second user device 210 at a time associated with occurrence of the transaction (e.g., GPS location data, Wi-Fi radio data, and/or the like). Transaction server 220 may compare the first geographic location of the first user device 210 and the second geographic location of the second user device 210 to determine whether the first user device 210 was in the same location as the second user device 210 at a time associated with the transaction.

In some implementations, based on transaction server 220 determining that the first user device 210 and the second user device 210 are in the same location (or within a threshold measure of distance from one another) at the time of the transaction, transaction server 220 may determine, or confirm, that the transaction occurred. In some implementations, based on transaction server 220 determining that the first user device 210 and the second user device 210 are not in the same location (or not within a threshold measure of distance from one another) at the time of the transaction, transaction server 220 may determine that the transaction did not occur.

In some implementations, based on transaction server 220 determining that the first geographic location of the first user device 210, the second geographic location of the second user device 210, and the geographic location provided in the transaction data are in the same location (or within a threshold measure of distance from one another) at the time of the transaction, transaction server 220 may determine, or confirm, that the transaction occurred. In some implementations, based on transaction server 220 determining that the first geographic location of the first user device 210, the second geographic location of the second user device 210, and the geographic location provided in the transaction data are not in the same location (or not within a threshold measure of distance from one another) at the time of the transaction, transaction server 220 may determine that the transaction did not occur.

In some implementations, based on transaction server 220 determining that the first geographic location of the first user device 210 and the geographic location provided in transaction data received from the second user device 210 are in the same location (or within a threshold measure of distance from one another) at the time of the transaction, transaction server 220 may determine, or confirm, that the transaction occurred. Similarly, in some implementations, based on transaction server 220 determining that the second geographic location of the second user device 210 and the geographic location provided in transaction data received from the first user device 210 are in the same location (or within a threshold measure of distance from one another) at the time of the transaction, transaction server 220 may determine, or confirm, that the transaction occurred. In some implementations, based on transaction server 220 determining that the first geographic location of the first user device 210 and the geographic location provided in transaction data received from the second user device 210 are not in the same location (or not within a threshold measure of distance from one another) at the time of the transaction, transaction server 220 may determine that the transaction did not occur. Similarly, in some implementations, based on transaction server 220 determining that the second geographic location of the second user device 210 and the geographic location provided in transaction data received from the first user device 210 are not in the same location (or not within a threshold measure of distance from one another) at the time of the transaction, transaction server 220 may determine that the transaction did not occur.

In some implementations, transaction server 220 may determine whether the transaction occurred using, in addition to or as an alternative to sensor data that indicates a geographic location, sensor data that does not indicate a geographic location. For example, accelerometer sensor data, environmental sensor data, microphone sensor data, and/or the like may be used by transaction server 220 to determine whether the transaction occurred.

By way of example, transaction server 220 may determine whether the transaction occurred based on environmental data included in the first sensor data. For example, environmental data included in the first sensor data may indicate weather conditions experienced by the first user device 210 during the time of the transaction (e.g., temperature, humidity, light level, and/or the like). Transaction server 220 may use the environmental data included in the first sensor data, as well as environmental data included in the second sensor data, to determine whether the first user device 210 and second user device 210 were at the same place at the time of the transaction.

As another example, transaction server 220 may determine whether the transaction occurred based on microphone data included in the first sensor data. For example, microphone data included in the first sensor data may indicate noise levels and or sounds proximate to the first user device 210 at the time of the transaction. Transaction server 220 may use microphone data included in the first sensor data, as well as microphone data included in the second sensor data, to determine whether the first user device 210 and the second user device 210 were at the same place at the time of the transaction. By determining whether the first user device 210 and the second user device 210 were at or near the same place at the time of the transaction, transaction server 220 may determine whether the transaction occurred.

In some implementations, transaction server 220 may use multiple types of sensor data to determine whether a transaction occurred. For example, transaction server 220 may associate weights for various types of sensor data and determine a confidence score for confirming a transaction (e.g., a measure of confidence that the transaction occurred). For example, matching the geographic locations of the first user device 210 and second user device 210 using GPS data may have a higher confidence score than matching temperatures measured by sensors of the first user device 210 and the second user device 210. In some implementations, transaction server 220 may use machine learning to develop a model for determining whether a transaction occurred. The model may be trained, for example, using a variety of different types of sensor data captured from user devices 210 in previous transactions. In this situation, transaction server 220 may use the model to determine whether the transaction occurred (e.g., by providing the first sensor data and the second sensor data as input to the model, receiving a confidence score from the model, and determining whether the transaction occurred based on satisfaction (or non-satisfaction) of a confidence score threshold.

In this way, transaction server 220 may determine whether the transaction occurred, enabling transaction server 220 to perform an action based on the determination, such as authenticating the transaction, logging the transaction, and/or providing a notification regarding the transaction.

As further shown in FIG. 4, process 400 may include receiving authentication data associated with the first user (block 450). For example, transaction server 220 may receive (e.g., from local and/or remote storage device, such as an authentication data storage device) authentication data associated with the user of the first user device 210. In some implementations, the authentication data was previously recorded for the user of the first user device 210, e.g., by transaction server 220 and/or a separate authentication device. The transaction server may, in some implementations, identify the authentication data based on data included in the transaction data and/or the first sensor data, such as a user account identifier associated with the user of the first user device 210.

The authentication data may include a variety of types of data that can be used to authenticate the user of the first user device 210. For example, the user of the first user device 210 may be authenticated using an authentication signature associated with information designed to uniquely identify the user of the first user device. By way of example, the authentication signature may include a fingerprint signature associated with one or more fingerprints of the user of the first user device 210, an ocular signature associated with one or more eye features of the user of the first user device 210, a gait signature associated with a movement pattern (e.g., walking pattern) of the user of the first user device 210, a historical location signature associated with historical locations associated with first user device 210 (e.g., first user device 210 may frequent a particular location and/or frequently travel a particular path, which may be used to authenticate the user), a facial recognition signature associated with one or more facial features of the user of the first user device 210, a retina recognition signature associated with one or more features of a retina of the user of the first user device 210, a voice signature associated with one or more features of a voice of the user of the first user device 210, and/or the like.

The authentication data may have been previously recorded for the user of the first user device 210 in a variety of ways. For example, the user of the first user device 210 may have previously used the first user device 210, or a separate device, to enroll for a particular type of authentication (e.g., fingerprint, ocular, gait, face, retina, voice, and/or the like) with transaction server 220 and/or a separate authentication device 230. Enrollment may include, for example, providing samples of sensor data used to generate an authentication signature (e.g., providing images of the face of the user of the first user device 210 to a facial recognition signature generating device; providing accelerometer, GPS, and/or gyroscope sensor data of the user of the first user device 210 to a gait signature generating device; and/or the like). Transaction server 220 may have access to one or more previously generated authentication signatures associated with the user of the first user device 210 (e.g., to enable transaction server 220 to authenticate transactions involving the user of the first user device 210).

While the example provided above involves receiving authentication data for the user of the first user device 210, in some implementations, transaction server 220 may receive authentication data for the user of the second user device 210 (e.g., in a manner similar to that provided above).

In this way, transaction server 220 may receive authentication data associated with the first user (and/or the second user), enabling transaction server to use the authentication data to determine whether the transaction is authentic.

As further shown in FIG. 4, process 400 may include determining whether the transaction is authentic based on the authentication data and the first sensor data (block 460). For example, transaction server 220 may determine whether the transaction is authentic based on the authentication data and the first sensor data. In some implementations, the transaction may be authenticated by authenticating the user of the first user device 210 and/or the user of the second user device 210. The user of the first user device 210 and/or the user of the second user device 210 may be authenticated, for example, based on the received authentication data and the first sensor data (in the case of authenticating the user of the first user device 210) or the second sensor data (in the case of authenticating the user of the second user device 210).

In some implementations, transaction server 220 may determine whether the user of the first user device 210 is authentic by comparing at least a portion of the first sensor data and an authentication signature included in the authentication data. For example, in a situation where the authentication signature is a facial recognition signature and the first sensor data includes an image of the face of the user of the first user device 210, transaction server 220 may compare the image and the facial recognition signature to determine whether the image provided in the first sensor data matches the facial recognition signature, e.g., indicating whether the user of the first user device 210 is authentic. As another example, in a situation where the authentication signature is a gait signature and the first sensor data includes sensor data from an accelerometer and a GPS component of the first user device 210, transaction server 220 may compare the sensor data from the accelerometer and the GPS component and the gait signature to determine whether the gait data included in the first sensor data matches the gait signature, e.g., indicating whether the user of the first user device 210 is authentic. As yet another example, In a situation where the authentication signature is a historical location signature, transaction server 220 may compare sensor data from the GPS component of the first user device 210 to historical location data associated with the first user device 210 to determine whether the first user device 210 is authentic. In some implementations, transaction server 220 provides authentication data and the first sensor data as input to an authentication device 230, enabling authentication device to determine whether the authentication data and the first sensor data indicate an authentic user of the first user device 210.

In some implementations, transaction server 220 may use multiple types of sensor data to determine whether the user of the first user device 210 is authentic. For example, transaction server 220 may associate weights for various types of sensor data included in the first sensor data and determine a confidence score for authenticating the user of the first user device 210 (e.g., a measure of confidence that the user is authentic). For example, matching fingerprint sensor data with a fingerprint authentication signature may have a higher confidence score than matching accelerometer data with a gait authentication signature. In some implementations, transaction server 220 may use machine learning to develop a model for determining whether a user is authentic. The model may be trained, for example, using a variety of different types of sensor data captured from user devices 210 in previous transactions. In this situation, transaction server 220 may use the model to determine whether the user is authentic (e.g., by providing the first sensor data as input to the model, receiving a confidence score from the model, and determining whether the user is authentic based on the satisfaction (or non-satisfaction) of a confidence score threshold.

While the example provided above involves determining whether the transaction is authentic based on first sensor data provided by the first user device 210, in some implementations, transaction server 220 may determine whether the transaction is authentic based on the second sensor data provided by the second user device 210 (e.g., in a manner similar to that provided above).

In this way, transaction server 220 may determine whether the transaction is authentic based on authentication data and first sensor data (and/or second sensor data), enabling transaction server 220 to perform an action based on the determination.

As further shown in FIG. 4, process 400 may include performing an action based on determining whether the transaction occurred or determining whether the transaction is authentic (block 470). For example, transaction server 220 may perform an action based on determining whether the transaction occurred, and/or transaction server 220 may perform an action based on determining whether the transaction is authentic.

In some implementations, the action may include providing a device with a notification regarding authentication and/or confirmation of the transaction. For example, transaction server 220 may provide the first user device 210 and/or the second user device 210 with data indicating the results of the transaction confirmation and/or authentication. Results may be provided via network 240 and, in implementations where transaction server 220 implements a peer-to-peer application server, transaction server 220 may provide the results to the first user device 210 and/or second user device 210 via the peer-to-peer application, enabling the user of the first user device 210 and/or the user of the second user device 210 to identify whether the transaction was confirmed and/or authenticated. In some implementations the device to which the notification is provided may be a third party device, such as a computing device operated by a third party auditor.

In some implementations, the action may include logging the result of the transaction confirmation and/or authentication. For example, transaction server 220 may communicate the results to a logging device, such as a data storage device, for storing transaction logs. Logs may be used to keep records, e.g., in case of an audit, or for other purposes, such as use as training data for machine learning algorithms that may improve transaction confirmation and authentication based on sensor data. For example, logged or otherwise stored sensor data may be used to improve an authentication signature for user device 210. The authentication signature may be improved, for example, by providing the sensor data as an additional input to authentication device 230 that generates the authentication signature, e.g., in a manner designed to increase the accuracy of the authentication signature.

In some implementations, the action may include crediting and/or debiting one or more user accounts. For example, based on a successful confirmation and/or authentication of a transaction, transaction server 220 may adjust one or more user accounts based on the transaction data. The user of the first user device 210 may have a user account that includes a payment account (e.g., an account with funds capable of being debited and/or credited). Transaction server may use a value included in the transaction data to debit and/or credit the user account of the user of the first user device 210 accordingly. For example, in a situation where the transaction data indicated that the user of the second user device 210 provided a product to the user of the first user device 210, and the transaction data indicates a value associated with the product, the user account of the user of the first user device 210 may be debited for the value provided in the transaction data. In a situation where the user of the second user device 210 also has a user account associated with transaction server 220, transaction server 220 may, in the example above, credit the user account of the user of the second user device for the value provided in the transaction.

In some implementations, the action may include denying or holding the transaction, e.g., pending additional confirmation and/or authentication. For example, if transaction server 220 does not confirm and/or authenticate a transaction, transaction server 220 may cause the transaction to be denied or held (e.g., by holding or denying the transaction at the transaction server 220 and/or notifying a third party associated with the transaction—such as a bank associated with the user of the first user device 210 and/or second user device 210). Denying and/or holding the transaction may enable the user of the first user device 210 and/or the user of the second user device 210 to retry confirmation and/or authentication of the transaction in the same or a similar manner, or using a different form of confirmation and/or authentication. Holding and/or denying a transaction based on lack of confirmation and/or authentication may increase the security of transactions performed by user devices 210 that make use of transaction server 220 to confirm and/or authenticate transactions.

In this way, transaction server 220 may perform an action based on determining whether the transaction occurred and/or determining whether the transaction is authentic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As noted above, the ability to use sensor data to confirm and/or authenticate a transaction may improve the security and reliability of peer-to-peer transactions, e.g., by reducing the occurrences of fraudulent transactions and/or identifying fraudulent transactions. Confirming a transaction may be simplified for users of user devices by, in some implementations, automating transaction confirmation without requiring a user to separately confirm or authenticate a transaction. Sensor based confirmation and/or authentication may also conserve resources (including processing resources, network resources, and/or time resources, for example) for user devices and transaction servers by obviating the need for users to manually confirm and/or authenticate a transaction, and/or obviating the need for manual investigation regarding authenticity of a transaction by operators of transaction servers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, coupled to the one or more memories, configured to:
      receive, from a plurality of devices, location data associated with a transaction between the plurality of devices;
      receive first data from a first device of the plurality of devices,
         wherein the first data includes first environmental sensor data corresponding to a first location associated with a first period of time, that is associated with the transaction, and
         wherein the first environmental sensor data is from a first sensor device of the first device and includes a first type of sensor data;
      receive, from a second device of the plurality of devices, second data,
         wherein the second data includes second environmental sensor data, corresponding to a second location associated with a second period of time, that is associated with the transaction, and
         wherein the second environmental sensor data is from a second sensor device of the second device and includes a second type of sensor data;
      determine, based on a machine learning model, and based on the location data, the first data, and the second data, a confidence score associated with confirming whether the transaction occurred,
         wherein the machine learning model is trained based on a plurality of types of sensor data, including the first type of sensor data and the second type of sensor data, and
         wherein the confidence score is determined based on different weights associated with comparison of the location data, the first location, and the second location;
      determine, based on authentication data received from the first device and the second device, and based on the first data and the second data, whether the transaction is authentic; and
      selectively credit, based on whether the transaction has occurred and based on whether the transaction is determined to be authentic, an account.

2. The device of claim 1, wherein confirming whether the transaction occurred is further based on determining whether the first location is within a threshold distance from the second location.

3. The device of claim 1, wherein confirming whether the transaction occurred is further based on determining whether the first location is within a threshold distance from the second location for a period of time.

4. The device of claim 1, wherein the one or more processors are further configured to:
   determine, based on comparing first environmental data and second environmental data, that the first device and the second device were in a same geographical area associated with the transaction.

5. The device of claim 1, wherein determining whether the transaction is authentic is based on the authentication data and the second data.

6. The device of claim 1, wherein the transaction is associated with a peer-to-peer application operating on one or more of the plurality of devices.

7. The device of claim 1, wherein the first environmental sensor data include accelerometer data associated with the first device.

8. A method, comprising:
   receiving, by a device and from a plurality of devices, location data associated with a transaction;
   receiving, by the device and from a first device of the plurality of devices, first data,
      wherein the first data includes first environmental sensor data corresponding to a first location associated with a first period of time, that is associated with the transaction, and
      wherein the first environmental sensor data is from a first sensor device of the first device and includes a first type of sensor data;
   receiving, by the device and from a second device of the plurality of devices, second data,
      wherein the second data includes second environmental sensor data, corresponding to a second location associated with a second period of time, that is associated with the transaction, and
      wherein the second environmental sensor data is from a second sensor device of the second device and includes a second type of sensor data;
   determining, by the device, based on a machine learning model, and based on the location data, the first data, and the second data, a confidence score associated with confirming whether the transaction occurred,
      wherein the machine learning model is trained based on a plurality of types of sensor data, including the first type of sensor data and the second type of sensor data, and
      wherein the confidence score is determined based on different weights associated with comparison of the location data, the first location, and the second location;
   determining, by the device, based on authentication data received from the first device and the second device, and based on the first data and the second data, whether the transaction is authentic; and
   selectively credit, by the device, based on whether the transaction has occurred, and based on whether the transaction is determined to be authentic, an account.

9. The method of claim 8, wherein confirming whether the transaction occurred is further based on determining whether the first location is within a threshold distance from the second location.

10. The method of claim 8, wherein confirming whether the transaction occurred is further based on determining whether the first location is within a threshold distance from the second location for a period of time.

11. The method of claim 8, further comprising:
determine, based on comparing first environmental data and second environmental data, that the first device and the second device were in a same geographical area associated with the transaction.

12. The method of claim 8, wherein determining whether the transaction is authentic is based on the authentication data and the second data.

13. The method of claim 8, wherein the transaction is associated with a peer-to-peer application operating on one or more of the plurality of devices.

14. The method of claim 8, wherein the first environmental sensor data include accelerometer data associated with the first device.

15. A non-transitory computer-readable medium storing a set of instructions, the set of instructions comprising:
one or more instructions that, when executed by one or more processors of a device, cause the device to:
receive, from a plurality of devices, location data associated with a transaction;
receive first data from a first device of the plurality of devices,
wherein the first data includes first environmental sensor data corresponding to a first location associated with a first period of time, that is associated with the transaction, and
wherein the first environmental sensor data is from a first sensor device of the first device and includes a first type of sensor data;
receive, from a second device of the plurality of devices, second data,
wherein the second data includes second environmental sensor data, corresponding to a second location associated with a second period of time, that is associated with the transaction, and
wherein the second environmental sensor data is from a second sensor device of the second device and includes a second type of sensor data;
determine, based on a machine learning model, based on the location data, the first data, and the second data, a confidence score associated with confirming whether the transaction occurred,
wherein the machine learning model is trained based on a plurality of types of sensor data, including the first type of sensor data and the second type of sensor data, and
wherein the confidence score is determined based on different weights associated with comparison of the location data, the first location, and the second location;
determine, based on authentication data received from the first device and the second device, and based on the first data and the second data, whether the transaction is authentic; and
selectively credit, based on whether the transaction has occurred and based on whether the transaction is determined to be authentic, an account.

16. The non-transitory computer-readable medium of claim 15, wherein confirming whether the transaction occurred is further based on determining whether the first location is within a threshold distance from the second location.

17. The non-transitory computer-readable medium of claim 15, wherein confirming whether the transaction occurred is further based on determining whether the first location is within a threshold distance from the second location for a period of time.

18. The non-transitory computer-readable medium of claim 15, wherein the one or more instructions further cause the device to:
determine, based on comparing first environmental data and second environmental data, that the first device and the second device were in a same geographical area associated with the transaction.

19. The non-transitory computer-readable medium of claim 15, wherein determining whether the transaction is authentic is based on the authentication data and the second data.

20. The non-transitory computer-readable medium of claim 15, wherein the transaction is associated with a peer-to-peer application operating on one or more of the plurality of devices.

* * * * *